US010532300B2

(12) United States Patent
Pierre

(10) Patent No.: US 10,532,300 B2
(45) Date of Patent: Jan. 14, 2020

(54) FILTERING DEVICE

(71) Applicant: COMMISSARIAT A L'ENERGIE ATOMIQUE ET AUX ENERGIES ALTERNATIVES, Paris (FR)

(72) Inventor: Jocelyn Pierre, Sainte-Tulle (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 493 days.

(21) Appl. No.: 15/125,093

(22) PCT Filed: Mar. 12, 2015

(86) PCT No.: PCT/EP2015/055249
§ 371 (c)(1),
(2) Date: May 16, 2017

(87) PCT Pub. No.: WO2015/136062
PCT Pub. Date: Sep. 17, 2015

(65) Prior Publication Data
US 2017/0246566 A1      Aug. 31, 2017

(30) Foreign Application Priority Data
Mar. 12, 2014   (FR) ..................... 14 52056

(51) Int. Cl.
*B01D 35/153*      (2006.01)
*G21F 9/06*       (2006.01)
(Continued)

(52) U.S. Cl.
CPC ....... *B01D 35/153* (2013.01); *B01D 33/0133* (2013.01); *B01D 33/39* (2013.01);
(Continued)

(58) Field of Classification Search
CPC ........ C02F 1/001–003; C02F 2103/007; C02F 2103/08; B01D 35/153; B01D 33/39;
(Continued)

(56) References Cited

U.S. PATENT DOCUMENTS 3,595,397 A * 7/1971 Abos ....................... C02F 1/003
210/232
4,280,906 A * 7/1981 Liljegren ............... B01D 29/23
210/282

(Continued)

FOREIGN PATENT DOCUMENTS

| EP | 0 920 894 A1 | 6/1999 |
|----|--------------|--------|
| WO | WO 2005/002706 A1 | 1/2005 |
| WO | WO 2005/057022 A1 | 6/2005 |

OTHER PUBLICATIONS

International Search Report dated Jul. 20, 2015, in PCT/EP2015/055249 filed Mar. 12, 2015.

*Primary Examiner* — Liam Royce
(74) *Attorney, Agent, or Firm* — Oblon, McClelland, Maier & Neustadt, L.L.P.

(57) ABSTRACT

A filtering device, a system including the filtering device, and methods of using the filtering device. The filtering device is configured to be arranged inside a fluid to be filtered and comprising at least one main filter and a filter holder supporting the main filter. The filtering device is configured to be moved inside the fluid, in such a way that when the filtering device is moved in a first movement direction, at least one part of the fluid passes through the main filter in a first filtering direction. The filtering device is configured in such a way as to prevent the fluid from passing through the main filter in a second filtering direction opposite to the first filtering direction when the filtering device is moved in a second movement direction opposite to the first movement direction.

30 Claims, 8 Drawing Sheets

(51) Int. Cl.
| | |
|---|---|
| *G21C 19/307* | (2006.01) |
| *B01D 33/39* | (2006.01) |
| *C02F 1/00* | (2006.01) |
| *B01D 33/42* | (2006.01) |
| *B01D 33/01* | (2006.01) |
| *C02F 103/08* | (2006.01) |
| *C02F 103/00* | (2006.01) |

(52) U.S. Cl.
CPC .............. *B01D 33/42* (2013.01); *C02F 1/001* (2013.01); *G21C 19/307* (2013.01); *G21F 9/06* (2013.01); *C02F 2103/007* (2013.01); *C02F 2103/08* (2013.01)

(58) Field of Classification Search
CPC .. B01D 33/0133; B01D 33/42; G21C 19/307; G21F 9/06
See application file for complete search history.

(56) References Cited

U.S. PATENT DOCUMENTS

| | | |
|---|---|---|
| 6,241,101 B1 | 6/2001 | Roodenrijs |
| 2006/0151381 A1 | 7/2006 | Wennerstrom |
| 2012/0251413 A1 | 10/2012 | Ellis et al. |
| 2014/0008310 A1 | 1/2014 | Weston et al. |
| 2014/0008311 A1 | 1/2014 | Weston et al. |

\* cited by examiner

FILTERING DEVICE

TECHNICAL FIELD OF THE INVENTION

This invention in general relates to the filtration of fluids. It receives for advantageous application the filtration of fluids that is delicate to extract from their environment for reasons of contamination, dangerousness or simply accessibility.

The invention is particularly advantageous for the filtration of fluids used in nuclear research or irradiation reactors.

In this type of application, the invention makes it possible to easily recover the precipitates of fluid metal, for example alkalines, coming from a pollution with hydrogen and oxygen, in particular for irradiated devices.

PRIOR ART

A certain number of experiments in an irradiation nuclear reactor (such as the OSIRIS reactor for example) are carried out on samples in a bath of fluid metal, sodium or a sodium/potassium mixture (commonly referred to as NaK). The advantage of these experimental conditions is to be able to reach the temperature levels desired by the experiment (usually between 280° C. and 400° C.), with good homogeneity of the temperatures that a fluid procures and without the constraints of water that a pressurized enclosure would suppose. As such, many irradiations of samples of materials in nuclear (of which first in line are zirconium alloys) are immersed in the NaK for durations in the reactor than can reach a few years.

However, as with any alkaline compound, NaK is very strong oxygen and hydrogen taker, in any form whatsoever. It is therefore important to constantly handle this fluid under a neutral gas. Despite all of the precautions taken, the removing and the introducing of samples in particular introduce impurities (for example water in the form of the humidity of the air) that react in the fluid metal forming hydroxides and hydride compounds. These precipitates, hardly soluble when cold, are dissolved considerably in temperature conditions of the irradiation reactor. As such, the gaseous hydrogen present in a significant quantity in the NaK can then diffuse into the samples after their adsorption. As zirconium compounds have an affinity for hydrogen that is greater than that of alkalines, the hydrogen penetrates easily and in depth into the experimental samples, reaching concentrations such that the mechanical properties of these samples are greatly modified, which can make them weak.

These modifications as such distort the experiments and can even made the results thereof unusable.

The solution that is currently used in order to prevent these issues consists in oxidizing the samples very slightly in order to obtain via this surface treatment a layer that prevents the adsorption of the hydrogen. This solution is valid only for new samples and by admitting that the thickness of oxide does not create any modification of the mechanical properties of the sample. The scope of this solution is consequently limited. For a sample that is already irradiated or in the case of an explicit prohibition of the owner of the sample, it is not possible to pre-oxidize these samples. The source of pollution must therefore be removed.

It could as such be attempted to search for solutions to purify this type of fluid.

In the general field of filtration of conventional fluids, i.e. not dangerous, several solutions have been proposed.

These solutions provide to provide the circuit of circulation of the fluid with a loop dedicated to the filtration function.

This loop comprises generally a filter, a pump, hot and/or cold traps with correlatively a control of the temperatures. Indeed, the solubilities of the pollutants that have precipitated out are often a function of the temperatures. The use of these circuits then requires increasing the temperature in order to solubilize the precipitated chemical compounds then abruptly reducing downstream of the circuit the temperature below the desired limit of solubility, while still remaining above the solidification temperature of the fluid. The filter placed immediately after this cooling stage as such traps the precipitates. The level of the cooling temperature controls the residual concentration of pollutant according to its given precipitation limit.

These solutions are relatively effective for fluids that do not have any particular dangerousness. However, for dangerous fluids, typically fluids that have a danger of the radiological and/or chemical type), the installation for putting into movement the fluid through the filtering loop is very complex to implement. The technical and financial impacts of these solutions are often unacceptable Finally, there is another type of solution, for example for very large volumes and even without the fluids having a particular dangerousness, which is not based on a circuit dedicated to filtration but which is based on passive filtration, consisting in recovering via gravity the precipitates and other residue. This type of solution 3 nevertheless has the disadvantage of not allowing for satisfactory filtering in terms of filtering rapidity and to not be suited for fluids that are not immobile, for example which can undergo a planned or unplanned mixing.

There is therefore a need consisting in proposing a solution for effectively filtering a fluid, for example a dangerous fluid, while still reducing the technical or financial constraints that the known solutions have.

That is the object of this invention.

SUMMARY OF THE INVENTION

In order to achieve this objective, an aspect of this invention relates to a filtering device configured to be arranged inside a fluid to be filtered, for example inside the container of the fluid and comprising at least one filter and a filter holder supporting the filter. The filtering device is configured to be moved inside the fluid, for example inside the container of the fluid, in such a way that when the filtering device is moved in a first movement direction, at least one part of the fluid passes through the filter in a first filtering direction.

As such the filtering is provided by a movement of the filtering device with respect to the fluid and to the container of this fluid, such as a duct, a tank or a reservoir. The filtering device forms as such a piston in the container.

The fluid can as such be left immobile or be driven in movement in the container. The invention as such makes it possible to avoid many disadvantages induced by known solutions and mentioned hereinabove. In particular, the invention makes it possible to void a circuit dedicated to filtration with a circulation pump and equipment for managing the temperature in order to control the formation of the precipitates to be filtered.

The invention as such proposes a simple, reliable and economical solution for filtering a possibly static fluid, and this, inside the equipment itself wherein it is used.

It is in particular particularly advantageous for filtering fluids that are very difficult to transfer into a circuit that is exclusively dedicated to cleaning for example for reasons of contamination, dangerousness or operations. Such is in particular the case of circuits provided on nuclear research or irradiation reactors such as the OSIRIS reactor. Applied to these reactors, the invention makes it possible to prevent the transmission of the pollution to the samples immersed in the fluid, pollution which could be detrimental for the experiment.

The invention is not however limited to the application to the nuclear field and extends to any type of fluid, in particular any fluid able to be loaded with solid particles in the conditions of use thereof.

According to an advantageous embodiment, the filtering device is configured in such a way as to prevent the fluid from passing through the filter in a second filtering direction opposite to the first filtering direction when the filtering device is moved in a second movement opposite to the first movement direction.

The invention as such makes it possible to ensure a particularly effective filtering. Indeed, when the filtering device is moved in a first direction, the fluid is filtered through the filter and accumulates in the latter residue. When the filtering device is moved in the opposite direction, the fluid cannot pass through the filter in the opposite direction, as such prohibiting the discharging of a portion of the residue that has accumulated therein and their dispersion in the fluid.

According to other embodiments described in detail in what follows in reference to the figures, the invention relates to a filtering device configured to be immersed at least partially in a fluid to be filtered and comprising at least one main filter and a filter holder supporting the main filter. The filtering device is configured to be moved inside the fluid.

Advantageously, the filter holder comprises a body and at least one first and a second valve unit, the body and the two valve units defining a filtering chamber inside of which the main filter is arranged.

Advantageously, the main filter has an outer wall turned next to the body and an inner wall opposite to the outer wall; with the main filter delimiting in the filtering chamber, an inner portion and an outer portion of the filtering chamber located on either side of the inner and outer walls of the main filter.

Advantageously, the filter holder comprises at least one inlet opening defined by the first valve unit and at least one first intake valve cooperating with the inlet opening and configured to allow the fluid to pass through the inlet opening only when the filtering device is moved in a first movement direction.

Advantageously, the filter holder comprises at least one outlet opening defined by the second valve unit and at least one first release valve cooperating with the outlet opening and configured to allow the fluid to pass through the outlet opening only when the filtering device is moved in said first movement direction.

Advantageously, the first intake valve is arranged upstream of the first release valve with respect to the direction of flow of the fluid in the filtering device when the latter is moved in the first movement direction.

Advantageously, the device is arranged in such a way that the passage of the fluid through the inlet opening allows the fluid located upstream from the filtering device when the latter is moved in the first movement direction to penetrate into the filtering chamber.

Advantageously, the passage of the fluid through the outlet opening allows the fluid located in the filtering chamber to flow out of the filtering chamber when the filtering device is moved in the first movement direction.

Advantageously, the inlet opening and the outlet opening are arranged in such a way that when the filtering device is moved in said first movement direction, the fluid must pass through the main filter in a first filtering direction by passing from the inlet opening to the outlet opening.

Advantageously, the filtering device is configured in such a way as to prevent the fluid from passing through the main filter in a second filtering direction opposite to the first filtering direction when the filtering device is displaced in a second movement direction opposite to the first movement direction.

Other optional characteristics of the invention, which can be implemented in a combined manner according to all combinations or alternatively, are indicated hereinafter:

Advantageously, the inlet opening opens into the inner portion of the filtering chamber and the outlet opening opens into the outer portion of the filtering chamber, in such a way that the fluid must pass through the main filter from its inner wall to its outer wall.

As such, regardless of the movement direction of the filtering device, the fluid is filtered and the main filter is passed through in a single direction. The residue is then not discharged via an inverse flow. Moreover, a single filter allows for filtering in both directions, which facilitates the assembly of the filtering device as well as the storage and the manipulation of the used filters. Moreover, all of the residue is trapped on the inner face of the filter which reduces the risk of pollution during the handling thereof.

Advantageously, the filtering device is configured to be moved in translation inside a container in which the fluid is contained.

Advantageously, the body extends substantially longitudinally.

The filtering device is configured in such a way as to force a part of the fluid at 3 least to pass through said main filter in the first filtering direction when the filtering device is moved in the second movement direction.

Advantageously, the first intake valve is configured to prevent the entering and the exiting of the fluid respectively in and out of the inner portion of the filtering chamber and through the opening when the filtering device is moved in the second to movement direction.

Advantageously, the first intake valve is configured to allow the fluid to pass from the outside of the filtering chamber to a first portion of the filtering chamber located next to a first wall of the main filter when the filtering device is moved in the first movement direction.

Advantageously, the device comprises at least one second intake valve associated with another inlet opening and configured to allow the fluid to pass from the outside of the filtering chamber to the inner portion of the filtering chamber via said other inlet opening when the filtering device is moved in the second movement direction and configured to prevent the entering and the exiting of the fluid respectively in and out of said first portion via said other inlet opening when the filtering device is moved in the first movement direction.

Advantageously, the first intake valve is arranged upstream of the second intake valve with respect to the direction of flow of the fluid in the filtering device when the latter is moved in the first movement direction.

Advantageously, the filtering device is configured to be moved in translation inside a container in which the fluid is contained.

Alternatively, the filtering device is configured to be moved in rotation inside the container.

The container is typically a circuit or a portion of a circuit. It can also be a tank or a reservoir.

According to an embodiment, the filtering device is configured in such a way as to force a part of the fluid at least to pass through said filter in the first filtering direction when the filtering device is moved in the second movement direction. As such, particularly advantageously, the fluid always passes through the filter in the first filtering direction regardless of the movement direction of the filtering device. Advantageously, the device can as such comprise a single filter which is passed through in the same direction regardless of the movement direction of the filter holder.

According to an embodiment, the filtering device forms at least one filtering chamber comprising the filter and comprises:
- at least one first valve configured to allow the fluid to pass from the outside of the filtering chamber to a first portion of the filtering chamber located next to a first wall of the filter when the filtering device is moved in the first movement direction and configured to prevent the entering and the exiting of the fluid respectively in and out of said first portion when the filtering device is moved in to the second movement direction;
- at least one second valve configured to allow the fluid to pass from the outside of the filtering chamber to said first portion of the filtering chamber when the filtering device is moved in the second movement direction and configured to prevent the entering and the exiting of the fluid respectively in and out of said first portion when the filtering device is moved in the first movement direction.

According to an embodiment, the first valve is arranged upstream of the second valve with respect to the direction of flow of the fluid in the filtering device when the latter is moved in the first movement direction.

According to an embodiment, the filtering device comprises at least two outlet openings configured to allow the fluid to pass from a portion of the filtering chamber located next to a second wall of the filter opposite to the first wall to the outside of the filtering chamber downstream of the filtering device, with one of the two openings allowing for the exiting of the fluid downstream of the filtering device when the latter is moved in the first direction and the other of the two openings allowing for the exiting of the fluid downstream of the filtering device when the latter is moved in the second direction.

According to an embodiment, the filtering device comprises at least two outlet valves, each one respectively associated with one of the at least two outlet openings. Each outlet valve is configured to allow the passage of the fluid from the second portion downstream of the filtering device and to prevent the passage of the fluid from upstream of the filtering device to the second portion of the filtering chamber.

According to an embodiment, each outlet valve prevents the passage of the fluid to the outlet opening that it is associated with when it is thrust on a valve seat and comprises a hole arranged to the right of an inlet orifice allowing the fluid located upstream from the filtering device to access the first and second valves.

According to an embodiment, the filtering device is configured to be moved in translation inside the container and the filter has the shape of a cylinder extending according to the direction of translation of the filtering device.

According to another embodiment, the filtering device is configured in such a way as to prevent the fluid from passing through the filter when the filtering device is moved in the second movement direction.

Preferably, the filtering device comprises at least one first valve arranged downstream of the filter, relatively to the movement direction of the fluid with respect to the filtering device when the latter is moved in the first movement direction and arranged upstream of the filter, relatively to the movement direction of the fluid with respect to the filtering device when the latter is moved in the second movement direction, with said first valve being configured:
- to open under the pressure of the fluid that has passed through the filter when the filtering device is moved in the first movement direction in such a way as to allow the fluid having passed through the filter to exit the filtering device;
- to maintain itself closed otherwise, i.e. when the filtering device is immobile or is moved in the second movement direction in such a way as to prevent the fluid from passing through the filter.

According to an embodiment, the filtering device comprises at least one second valve arranged upstream of the filter, relatively to the movement direction of the fluid with respect to the filtering device when the latter is moved in the first movement direction and arranged downstream of the filter, relatively to the movement direction of the fluid with respect to the filtering device when the latter is moved in the second movement direction, with said second valve being configured:
- to open under the pressure of the fluid when the filtering device is moved in the first movement direction in such a way as to allow the fluid to reach the filter,
- to maintain itself closed otherwise, i.e. when the filtering device is immobile or is moved in the second movement direction in such a way as to prevent the fluid that has passed through the filter from exiting the filtering device.

According to an embodiment, the filtering device is configured in such a way as to form, when the filtering device is moved in the first movement direction, at least one filtering path passing through the filter and configured in such a way as to form, when the filtering device is moved in the second movement direction, at least one leakage path through which the fluid bypasses the filter.

According to an embodiment, the filtering device is configured to be placed next to an inner wall of a container in which the fluid is contained and the leakage path is 3 formed, partially at least, by a portion of space located between said inner wall of the container and an outer wall of the filtering device.

According to an embodiment, the filtering device has an outer casing complementary to an inner wall carried by the container the leakage path being formed by a portion of space located between said inner wall of the container and the outer casing of the filtering device.

According to an embodiment, the filtering device is configured in such a way that, when the filtering device is moved in the first movement direction, all of the fluid passed through by the filtering device passes through the filtering path. Alternatively, the filtering device is configured in such a way that, when the filtering device is moved in the first movement direction, a portion of the fluid passed through by the filtering device passes through the filtering path and another part of the fluid passed through by the filtering device passes through the leakage path.

According to an embodiment, the minimum section for the passage of the leakage path is less than ⅓, even ⅕ and more preferably less than ⅛ of the minimum section of the filtering path.

According to an embodiment, the filtering device comprises two filtration stages, with each stage comprising a filter, with the filtering device being configured in such a way that:
- when the filtering device is moved in the first movement direction, at least one part of the fluid passes through the filter of the first stage and does not pass through the filter of the second stage,
- when the filtering device is moved in the second movement direction, at least one part of the fluid passes through the filter of the second stage and does not pass through the filter of the first stage.

As such, the filtering path formed by one stage opens into or extends the leakage path of the other stage. The filtering device as such has a symmetrical operation.

According to an embodiment, the first and second filters are successively arranged according to the direction of movement of the filtering device.

Each stage is provided with at least one valve and more preferably two valves. The valves of the two stages are mounted in opposition in such a way as to open only one stage per movement direction of the filtering device.

According to an embodiment, the shape of the filter defines a cavity that has at least one opening and at least one filtering wall having an inner face turned towards the inside of the cavity and an outer face turned towards the outside of the cavity. The filtering device is configured in such a way that the fluid penetrates into the cavity via the opening and is released therefrom by passing through the filtering wall from the inner face to the outer face when the filtering device is moved in the first direction. As such, the fluid passes through the filter from the inside to the outside of the cavity. The residue accumulates then on the inner face of the cavity and is not exposed to the outside. As such in the case of removal and/or of handling a used filter, the residue remains trapped inside the cavity which reduces the risks of detaching and of dispersion of the residue as well as the contamination of the surrounding medium.

Preferably, the filtering wall is continuous and has a base opposite to the opening. As such the residue can accumulate in the base.

According to an embodiment, the device is configured to be moved in translation inside a container. The cavity extends along a direction of translation of the filtering device and preferably has the shape of a portion of a cone extending along the direction of translation of the filtering device.

More generally, the cavity extends according to the direction of movement of the filtering device.

According to an embodiment, the filtering device comprises a flushing device configured to allow a flow of the fluid under the effect of gravity when the filtering device is sufficiently separated from an inner wall of the container in order to be able to flow freely at the periphery of the filtering device.

According to an embodiment, the flushing device comprises at least one flushing hole allowing the fluid that it contains to flow to the outside by bypassing the valve controlling the exiting of the fluid outside the filtering chamber. As such, even if the valve or valves are closed, the filtering device is automatically flushed.

According to an embodiment, the flushing device comprising a flushing filter, is arranged in such a way that fluid passing through the flushing hole must pass through the flushing filter.

According to an embodiment, the filter is fixed in a removable manner with respect to the filter holder. The maximum section of the filter, taken in a plane perpendicular to said direction of movement, is greater than 60% of the section of the inner wall of the container and preferably greater than 70% and preferably greater than 90%.

According to an embodiment, the filter holder is made of metal and the filter is preferably made of metal.

According to an embodiment, all of the parts forming the valves are made of metal.

Preferably, the fluid is a liquid. According to an embodiment, the liquid comprises or is formed of liquid metal.

According to another embodiment, the filtering device comprises a device for diverting the fluid, comprising at least one valve and preferably openings, orifices and ducts, and configured in such a way that when a part of the fluid contained in the container passes through the filter in a first passing direction, the fluid passes through the filter from a first wall to a second wall of the filter. The diversion device is furthermore configured in such a way as to prevent the fluid from passing through the filter from said second wall to the first wall of the filter when the filtering device is moved in the second movement direction.

According to another embodiment, the invention relates to a system comprising a container able to contain a fluid to be filtered and a filtering device according to the invention, arranged inside the container and configured to be moved manually or mechanically inside the container in such a way as to filter the fluid at least when it is moved in a first direction.

Other optional characteristics of the invention, which can be implemented in a combined manner according to all combinations or alternatively, are indicated hereinafter:

Advantageously, the container is fixed. According to an embodiment, the container is a duct or a tank. According to an embodiment, the system is configured in such a way that the filtering device can be moved freely in the container. As such, the filtering device is not articulated on the container. Moreover, the filtering device is not geometrically constrained by the container. According to an embodiment, the container has an inner wall and the filtering device comprises at least one longitudinal scraper configured to scrape the inner wall of the container and suspend the residue stuck on the walls of the container.

According to an embodiment, the longitudinal scraper protrudes with respect to an outer casing of the filtering device.

According to an embodiment, the filtering device is configured to be moved in translation inside the container and the longitudinal scraper extends primarily in a plane perpendicular to the direction of translation of the filtering device. Alternatively, if the filtering device is configured to be moved in rotation inside the container then the 3 scraper extends primarily in a direction parallel to the axis of rotation of the filtering device.

According to an embodiment, the filtering device comprises, at at least one of its ends, at least one end scraper protruding beyond an outer casing of the filtering device for scraping a bottom wall of the container and suspending the residue deposited on the bottom.

According to another embodiment, the invention relates to a method for depolluting a fluid, with the method comprising the movement inside a fluid to be filtered of a filtering device according to the invention immersed at least partially in the fluid.

According to a non-limiting embodiment, the fluid is contained in a duct or in a tank provided in a nuclear reactor or a factory and the movement of the filtering device is carried out manually or mechanically.

According to another non-limiting embodiment, the fluid is water contained in the sea or in a lake and the movement of the filtering device is provoked by the swells or waves. In this case the filtering device comprises a floating device that allows it to remain on the surface or at a desired depth. In this embodiment, the filtering device does not move in a container, except to consider that the littoral and the bottom bordering the body of water form a container. The filtering device is configured to be set into movement in the water by waves and swells. As such, the filtering device is driven in movement, for example according to a back-and-forth movement, with respect to the sea floor.

The other objects, characteristics and advantages of this invention shall appear when examining the following description and the accompanying drawings. It is understood that other advantages can be incorporated.

BRIEF DESCRIPTION OF THE FIGURES

The attached drawings are provided as examples and do not limit the invention. These drawings are diagrammatically representations and are not necessarily to the scale of the practical application.

The purposes and objects as well as the characteristics and advantages of the invention shall appear better in the detailed description of an embodiment of the latter which is shown in the following accompanying drawings wherein.

Figure 1:
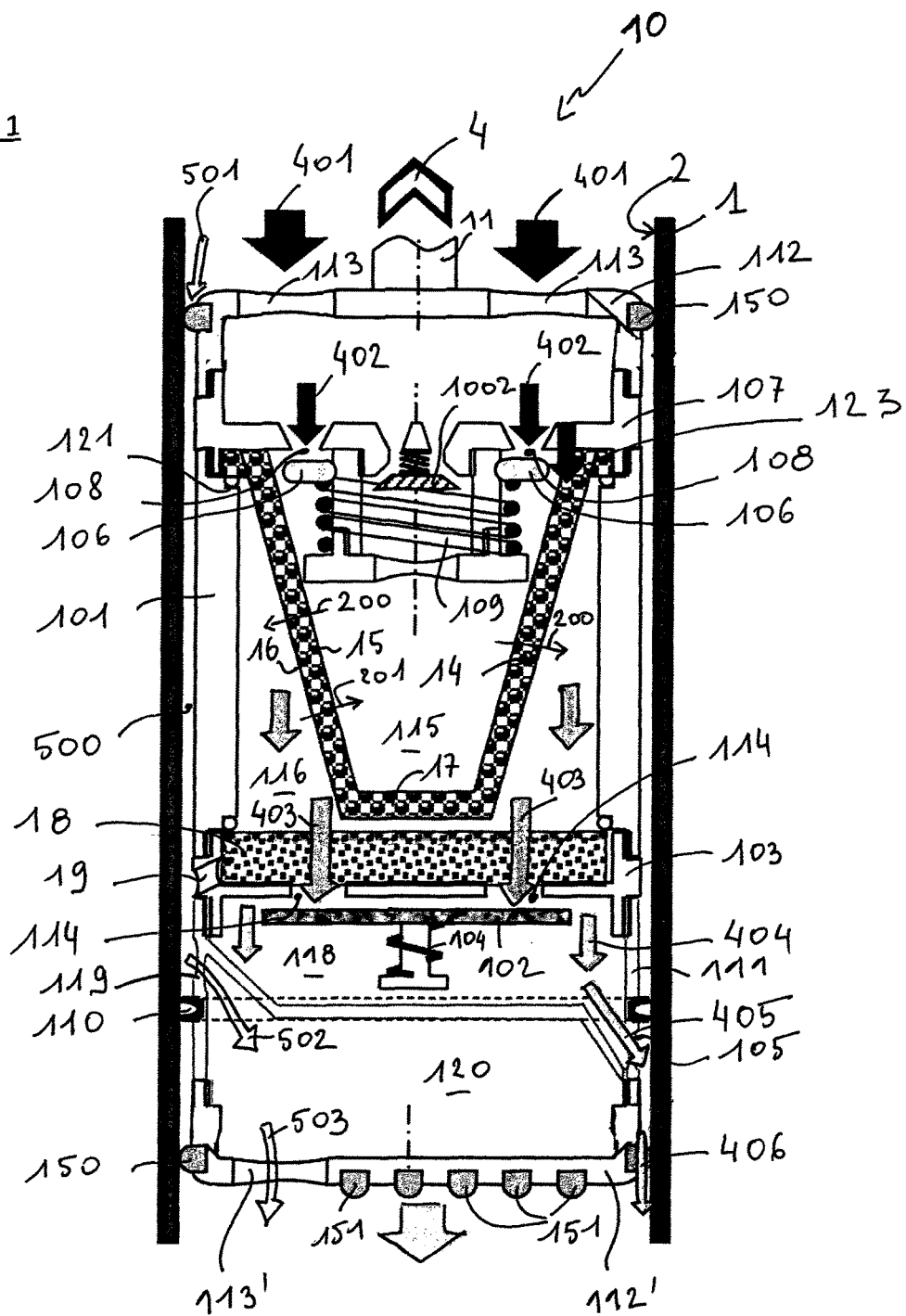
FIG. 1 is a drawing of a longitudinal cross-section view of a first embodiment 3 of the invention, with the filtering device being moved in a first movement direction with respect to a duct in which it is arranged.

A first embodiment shall now be described in reference to FIGS. 1 to 3.

In this embodiment, the filtering system comprises a filtering device 10 inserted into a container 1. The container 1 is typically a duct for the passage of the fluid. It can also be a reservoir or a tank.

The filtering device 10 comprises a main filter 14, a filter holder 100 and a device for the movement of the filter holder. Typically, this movement device is a beam 11 integral with the filter holder 100 and that can be manipulated by an operator or actuated in a motorized manner. Under the actuation of the movement device, the filtering device 10 slides along the duct and as such acts as a piston inside the latter.

The filtering device 10 forms, in this embodiment, a single filtration stage. The filtration stage comprises the main filter 14 and a filtering chamber inside of which the main filter is arranged 14, with the filtering chamber being delimited by a body 101 of the filter holder 100 extending substantially longitudinally and by two transverse walls 3 each one forming a valve unit 103, 107. The filtering chamber is also provided with at least one valve 102, 106 such as will be detailed in what follows. Preferably, the filtering chamber has two ends and comprises at least one valve 102, 106 at each one of its ends. Except for the flushing holes 19, 19' which will be detailed in what follows, the filtering chamber defines a sealed enclosure of which the access is controlled by the valves 102, 106. The main filter 14 delimits in the filtering chamber, two portions 115, 116 located on either side of the inner 15 and outer 16 walls of the main filter 14.

The filtration stage comprises at least one first release valve 102 also designated as first release valve cooperating with a valve unit 103 integral with the body 101 of the filter holder 100 and having at least one outlet opening 114. This first release valve 102 is configured to allow the fluid to pass through the outlet openings 114 only when the filtering device 10 is moved in a first movement direction 4.

As such, when the filtering device 10 is moved in a second movement direction 5 opposite to the first movement direction 4 or when the filtering device 10 is immobile with respect to the fluid, the first release valve 102 blocks the passage of the fluid and prevents it from accessing the filtering chamber. Typically, the first release valve 102 is formed by a valve mounted slidingly on the valve unit 103 forming a valve seat. A restoring element such as the spring 104 applies a force on the valve in order to maintain the latter in contact with the seat when the fluid does not exert sufficient inverse pressure.

This first release valve 102 is arranged downstream of the main filter 14 when the filtering device is moved in the first movement direction 4. As such, this first release valve 102 prevents the filtered fluid from being released outside of the filtering chamber when the filtering device 10 is actuated in the second movement direction 5.

The filtration stage comprises another valve referred to as first intake valve 106 cooperating with the valve unit 107 and being thrust against the latter by a restoring element such as the spring 109. This first intake valve 106 is configured to allow the entry of the fluid in the portion 115 of the filtering chamber when the filtering device 10 is moved in the first movement direction 4 and in order to prevent this otherwise.

Preferably, the filtering device 10 comprises a ferrule 112 integral with the body 101 via the valve unit 107 and whereon is fixed the beam 11. This ferrule 112 comprises orifices 113 that allow the fluid to reach the first intake valve 106.

In this embodiment, the first movement direction 4 corresponds as such to a movement generated by a traction exerted on the beam 11.

Preferably, a second ferrule 112' is provided to form the other end of the filtering device 10. This other ferrule 112' is preferably also provided with at least one orifice 113'.

The filtering device 10 also comprises a seal 110 that prevents or limits the passage of the fluid between an inner wall 2 of the container 1 and the filtering device 10.

The filter holder 100 comprises at least one outlet opening 105 arranged downstream of the first release valve 102 when filtering device 10 is moved in the first direction 4 and makes it possible to place the fluid being released from first release valve 102 in communication with a portion of space downstream of the seal 110. Preferably, a jacket 111 forms with the valve unit 103 an outlet chamber 118 and carries the outlet opening 105. The ferrule 112' is fixed to the jacket 111.

The routing of the fluid shall now be described during a movement of the filtering device 10 according to the first direct 4 in reference to FIG. 1. When the filtering device 10 is moved upwards in reference to FIG. 1, the fluid passes through the filtering device 10 from top to bottom as indicated by the arrows 401 to 406. Upstream and downstream of the filtering device 10 are therefore located at the top and at the bottom in this FIG. 1.

The fluid passes through 401 the orifices 113 of the ferrule 112 and reaches the valve unit 103.

Under the effect of the pressure of the fluid, the valve of the second intake valve 106 opens and allows the fluid to pass through the inlet opening 108. The fluid as such reaches the portion 115 of the filtering chamber next to the inner wall 15 of the main filter 14. This portion 115 of the filtering chamber is closed except for the inlet openings 108. The fluid is then forced to pass through the main filter 14 in the direction 200 of filtering, i.e. from the inner wall 15 to the outer wall 16 of the main filter 14.

The fluid as such arrives in the portion 116 of the filtering chamber next to the outer wall 16 of the main filter 14. This portion 116 of the filtering chamber is closed except for flushing holes 19 and outlet openings 114.

As the section of the latter is significantly greater than that of the flushing holes 19, the fluid exerts a pressure on the first release valve 102 and separates it from its seat. The fluid passes 403 through the outlet openings 114 to reach the outlet chamber 118, of which at least the outlet opening 105 opens 405 outside of the filtering device 10 and downstream of the seal 110 in order to be released downstream 406 of the filtering device 10. Note that preferably a flushing filter 18 is provided to filter the fluid flowing from the portion 116 of the filtering chamber in the direction of the openings 114 and of the flushing holes 19.

The fluid has as such travelled a filtering path shown by the arrows 401 to 406 during which it passed through the main filter 14 in order to leave in the latter the residue that it contains. Note that a portion of the fluid can also engage into a leakage path 500 defined by the space between the inner wall 2 of the container 1 and the outer casing of the filtering device 10.

More precisely, the fluid engages 501 into the leakage path 500 and penetrates to into the filtering device 10 via a leakage opening 119 carried by the jacket 111 and located upstream of the seal 110. Preferably, the fluid penetrates as such 502 into a leakage chamber 120 defined by the jacket 111 and exits 503 from the ferrule 112' downstream of the filtering device 10 via the orifice 113'.

The section of the leakage path 500 is defined by the relative dimensions of the inner wall 2 of the container 1 and of the maximum section of the filtering device 10 upstream of the seal 110.

This section is determined according to the rate of filtering desired, the resistance applied to the filtering device 10 and the number of back-and-forth movements that is desired to be carried out in order to obtain a satisfactory filtering. A zero section for the leakage path 500 leads to filtering in a single passage all of the fluid. A wide section requires carrying out a high number of passages in order to obtain satisfactory filtering.

The routing of the fluid shall now be described during a movement of the filtering device 10 in the second direction 5 and in reference to FIG. 2.

Figure 2:
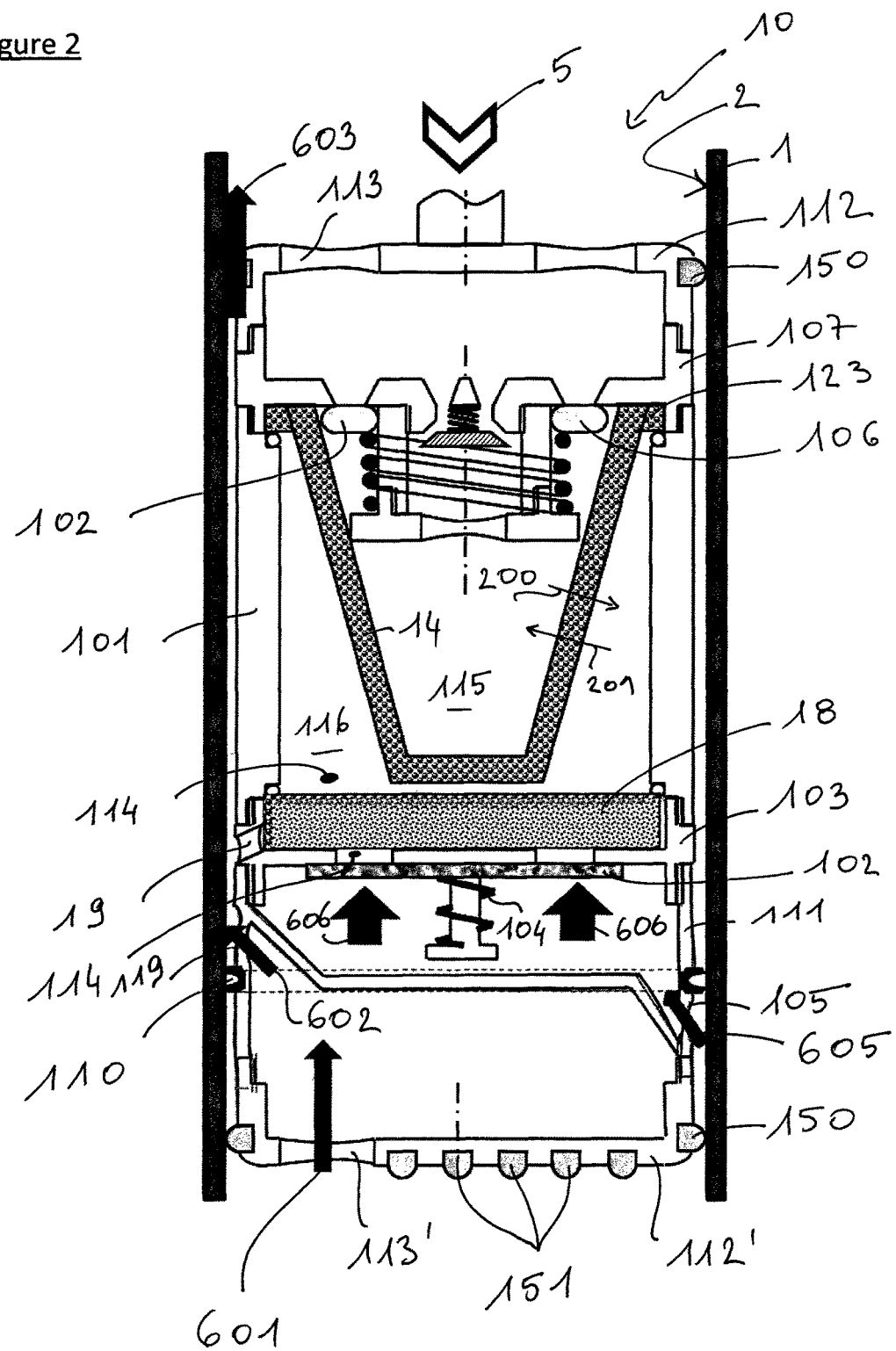
FIG. 2 is a drawing of a cross-section view of the embodiment shown in FIG. 1 wherein the filtering device is moved in a second movement direction opposite to the first movement direction.

When the filtering device 10 carries out a translation, in reference to FIG. 2 downwards, the fluid passes through the filtering device 10 from the bottom upwards as indicated by the arrows 601 to 606. Upstream and downstream of the filtering device 10 are in this case located respectively at the bottom and at the top in FIG. 2.

The fluid penetrates 601 into the leakage chamber 120 via the orifice 113' of the ferrule 112'. The leakage opening 119 allows the fluid to pass 602 into the leakage path 500 downstream of the seal 110 and to travel the leakage path 500 until exiting therefrom downstream 603 of the filtering device 10. The portion of fluid that passes upstream of the seal 110 between the inner wall 2 of the container 1 and the filtering device 10 penetrates 605 via the outlet opening 105 in the outlet chamber 118. The fluid therein is then blocked 606 by the first release valve 102 which remains thrust on its seat under the effect of the pressure of the fluid and of its spring 104. The fluid as such does not penetrate into the filtering chamber.

If a part of the fluid penetrates from the leakage path 500 to the portion 116 of the filtering chamber by passing through the flushing hole 19, then this fluid cannot be released downstream of the filtering chamber since the second intake valve 106 blocks it. As shall be detailed in reference to the embodiment shown in FIG. 4, a flushing 3 valve can be provided configured to prevent the fluid from passing from the leakage path to the filtering chamber via the hole 19.

As such, regardless of the route taken by the fluid, it does not pass through the filtering chamber. According to the effectiveness of the flushing valve, it may not even penetrate into the filtering chamber.

A valve 1002 having for seat the valve unit 107 can be provided.

Figure 4:
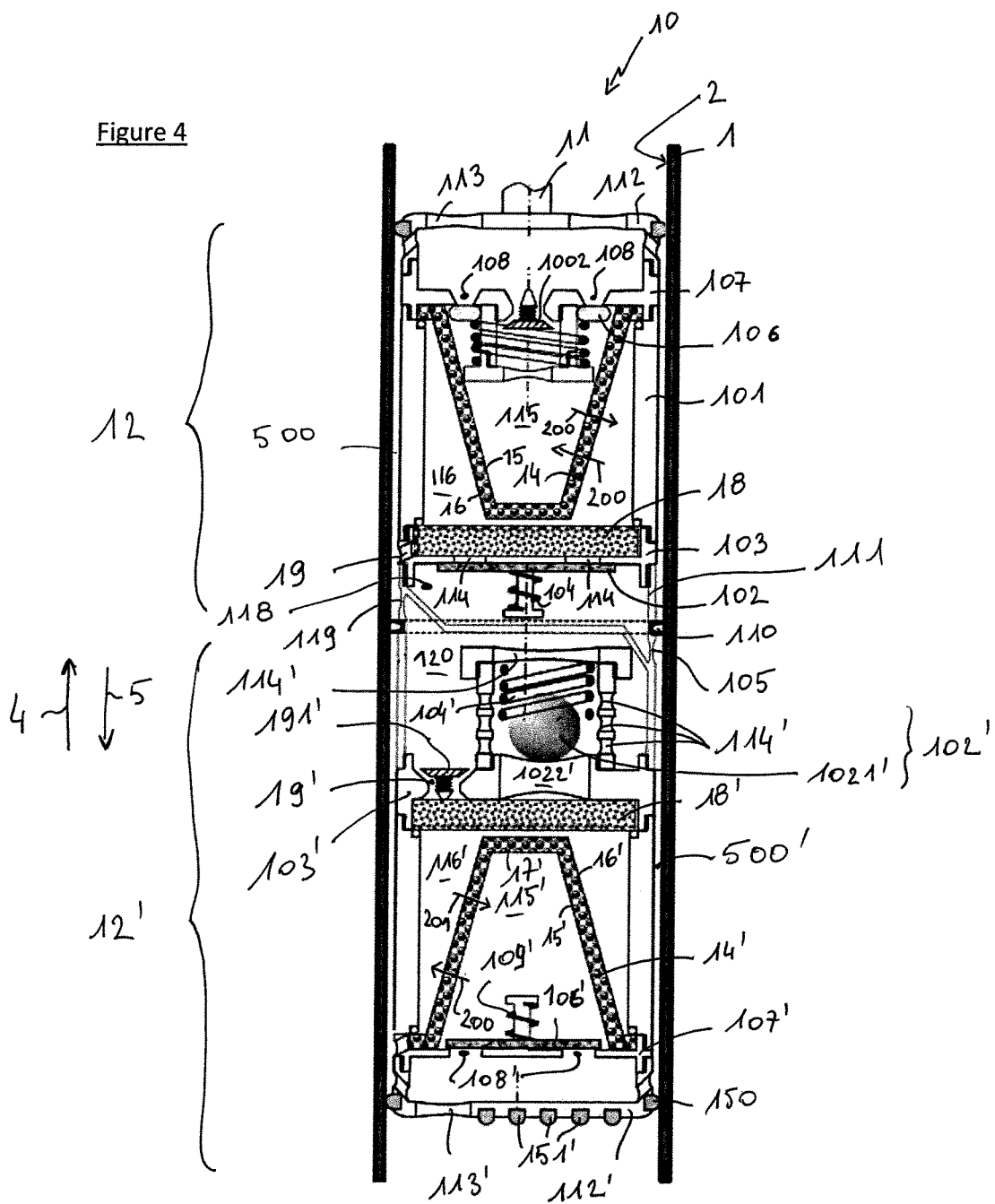
FIG. 4 is a drawing of a longitudinal cross-section view of a second embodiment of the invention comprising two filtration stages and allowing for a filtering by one of these two stages in each one of the filtration directions.

Preferably, the functionality of the valve 1002 is not the same as that of the valve 106. Advantageously, the function of the valve 1002 is dual. It enables a flushing function by providing an open position at rest, as shown in FIG. 4, an opening of the chamber 115 and a balancing of the pressure (inside/outside) of the fluid present in the chambers 115 and 116 in order to allow for a free flow towards the outside of the fluid that may still be present in these chambers. This valve 1002 must be closed in the same way as 106 when the fluid pushes in the movement direction 5. In the movement direction 4, this valve 1002 contributes like 106 to the passage of the fluid but does not constitute the favored passage of the latter.

According to the embodiment shown in FIG. 1 to 4, the intake valve has the shape of a ring. The valve 1002 is located inside the ring, preferably at its center.

As such, the filtration stage is unidirectional. The main filter 14 is passed through in only one direction 200 by the fluid and this regardless of the movement direction of the filtering device 10. This as such prevents the residue accumulated in the filter from being discharged under the effect of a reverse flow 201. The invention as such makes it possible to substantially improve the filtering and the safety during the handling of the filter.

As such, in this embodiment shown in FIGS. 1 and 2, the diversion device which makes it possible to control the conveying of the fluid through the filtering device in particular comprises the valves 102, 106, the inlet openings 108, the outlet openings 105, 114.

Moreover, note that the main filter 14 forms a cavity. As described above, the main filter 14 is passed through only in the direction 200, i.e. from its inner wall 15 to its outer wall 16. As such, the residue is trapped inside the cavity. This makes it possible to prevent the dispersion of the residue during the handling of the used filter.

Preferably, the cavity has an opening that can be accessed from the openings 108 of the valve unit 107 and also has a base 17. Outside of its opening, the main filter 14 is preferably continuous. Handled with its base turned downwards, the main filter 14 makes it possible as such to prevent the residue from being released via gravity, which 3 further reinforces safety.

Preferably, the main filter 14 can as such be removed in order to be replaced or cleaned. It is for example mounted tight between the body 101 and the valve unit 107 by crushing of the filter seal 123 between these two parts. More precisely, the valve unit 107 has an inner section that corresponds to the outer section of the base of the main filter 14 whereon the latter bears, which allows for easy positioning of the main filter 14 with respect to the valve unit 107. The body 101 has a shoulder 121 configured to come into contact with the filter seal 123, itself in contact with the base of the main filter 14 on a face opposite to that which is bearing on the valve unit 107.

The valve unit 107 is assembled on the body 101 for example by being screwed onto the latter.

The filter seal 123, made from a filtering material, provides the blocking of the filter 14.

In order to remove the main filter 14, it is sufficient to disassemble the valve unit 107 and the body 101 which makes it possible to access the main filter 14 and to grasp it easily. The invention as such allows for a replacing of the main filter 14 that is particularly simple, rapid and reliable.

Preferably, at least one circumferential scraper 150 mounted at the periphery of the filtering device 10 forms a protrusion beyond the outer casing of the latter in order to scrape the inner wall 2 of the container 1 during the movement of the filtering device 10. The impurities that can be deposited on the walls 2 are as such detached and put into suspension. Preferably, the scraper 150 has a discontinuous section in order to allow for the passage of the fluid. Advantageously, there are according to the direction of translation of the filtering device 10 several circumferential scraper s 150 with an angular offset around this direction, in such a way that the superposition of the circumferential scrapers 150 according to a projection perpendicular to the direction of translation, has a continuous profile over the entire edge of the filtering device 10, as such making it possible to scrape the entire surface of the inner wall 2, even when the filtering device 10 is carrying out only movements of translation.

According to an alternative embodiment or combined with the circumferential scrapers 150, the seal 110 can be configured to act as a scraper. The filtering device 10 also comprises end scrapers 151, configured to scrape a wall of the container 1 arranged substantially perpendicularly to the direction of translation of the filtering device 10. Such a wall can for example constitute an elbow, a duct or the bottom of a tank.

Figure 3:
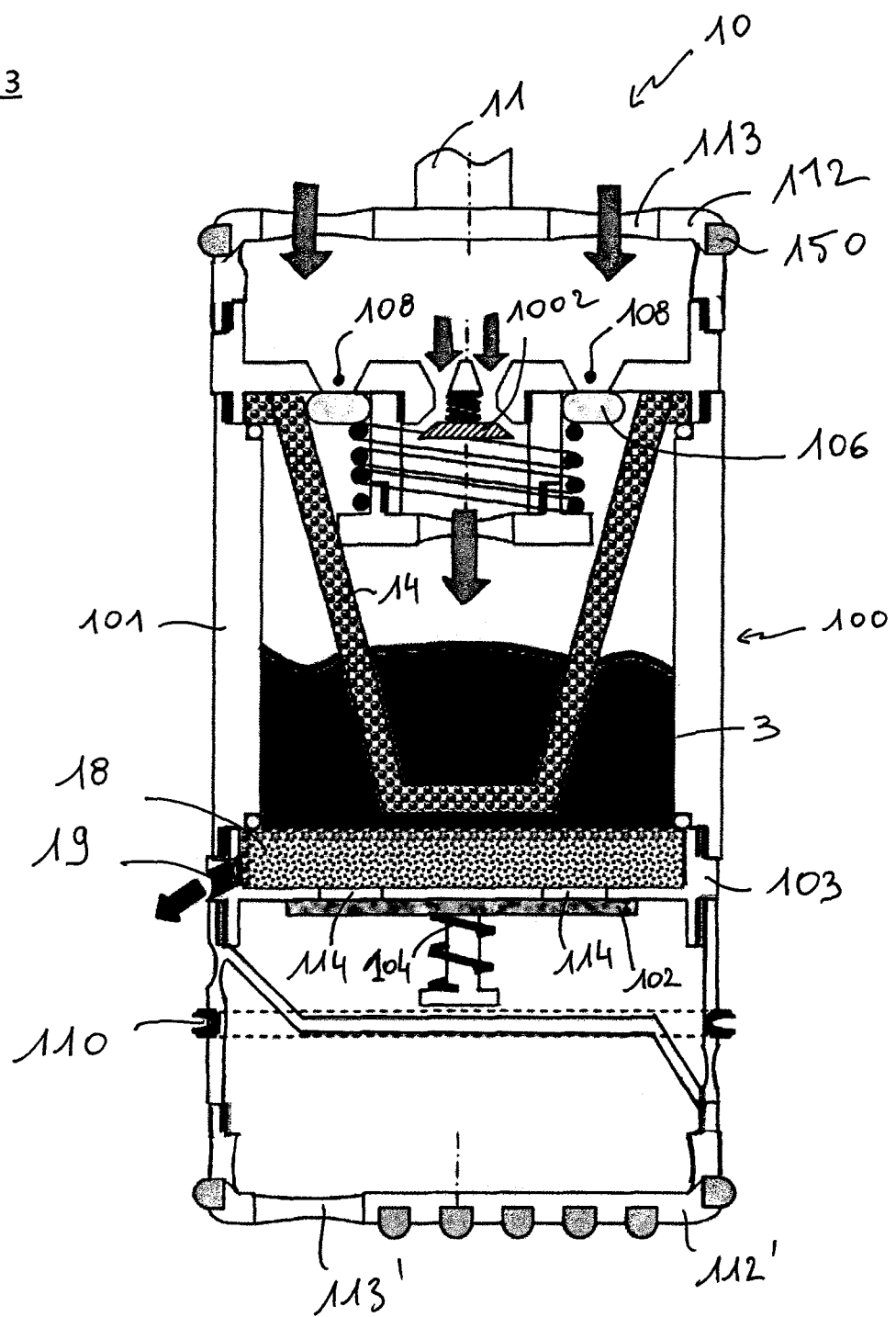
FIG. 3 is a cross-section view of the embodiment shown in FIG. 1 wherein the filtering device is removed from the duct or is placed in a wider section of the duct in order to automatically ensure the flushing of the filtering device.

FIG. 3 shows the automatic flushing of the filtering device 10 when it is 3 removed from the fluid or when it is brought in a section of the container 1 that is sufficiently wide so that the seal 110 is not applied on the inner wall 2 of the container 1. The fluid 3 accumulated in the filtering chamber flows via gravity through the flushing filter 18. The fluid 3 is blocked on the outlet openings 114 by the first release valve 102 and flows via the flushing hole 19. This flushing can be carried out outside of the container 1, even inside the container 1 itself in a volume of the container that does not comprise fluid. In this latter case, the fluid 3 that flows from the flushing remains in the container 1 and the filtering device 10 can be removed from the container 1 without any flow of fluid or with only a few drops. This is in practice very advantageous, when the fluid has a danger of the radiological and/or chemical and even bacteriological type.

In the embodiment described in reference to FIGS. 1 to 3, the filtering device 10 comprises a single filtration stage. The filtration is carried out only when the filtering device 10 is moved in only one of the directions, there one reference as 4. This filtering device 10 can as such be qualified as unidirectional.

The embodiment which shall now be described in reference to FIG. 4 is bidirectional, i.e. it filters the fluid in both movement directions. For this, the filtering device 10 has two filtration stages 12, 12'. Each one of the stages provides a filtering in one direction. These two stages 12, 13 are preferably symmetrical. As such, when the filtering device 10 is moved according to the direction 4, the stage 12 provides the filtering and the filter of the stage 13 is not passed through by the fluid. Inversely, when the filtering device 10 is moved according to the direction 5, the stage 13 provides the filtering and the filter of the stage 12 is not passed through by the fluid. The stage 12 corresponds to the filtering device 10 described in reference to FIGS. 1 to 3. The stage 13 also corresponds to the filtering device 10 described in reference to FIGS. 1 to 3 by being arranged symmetrically to the stage 12 along a plane perpendicular to the direction of movement of the filtering device 10 and passing through the seal 110. As such, when the filtering device 10 is placed in the direction 4, the fluid is released (see the arrow 405 of FIG. 1) outside of the chamber 118 via the outlet opening 105, this fluid arrives in the volume closed by the outer wall of the filtering device 10 downstream of the seal 110 and the inner wall 2 of the container 1, volume which corresponds to the leakage path 500' for the stage 13. The fluid therefore no longer enters into the filtering device 10 and flows downstream. The fluid which has not entered into the filtering chamber of the stage 13 but having used the leakage path 500 opens via the leakage opening 119 into the leakage chamber 120. This leakage chamber 120 corresponds for the stage 13 to an outlet chamber. The fluid reaching this chamber 120 maintains the second release valve 102' closed which prevents it from reaching the 3 filtering chamber of the stage 13.

For the purposes of illustration, in this example, the second release valve 102' has a structure that is different from the first release valve 102 which is functionally symmetrical to it. Indeed, although the first release valve 102 is based on a transfer valve, the second release valve 102' is based on a ball valve 1021' with a seat 1022' with complementary section. A means of restoring such as the spring 104' exerts on the ball 1021' a force for maintaining on its seat 1022' in order to ensure a closing of the outlet opening 114' except when the fluid exerts a sufficient pressure on the ball 1021' in order to counter the force of the spring and separate the ball 1021' from its seat 1022'.

Such a force can be exerted only during a movement of the filtering device 10 in the direction 5.

With a movement in the direction 4, the ball 1021' remains in contact with the seat 1022' and the fluid cannot reach the filtering chamber of the stage 13.

As such, the embodiment shown in FIG. 4 shows three different types of valves. It is understood that for each one of the valves of each one of the embodiments of the invention, any one of these types of valves, even any other type of valve, can be used.

Preferably, as shown, a jacket 111 is assembled at one of its ends to the valve unit 103 of the first stage 12 and at the other of its ends to the valve unit 103' of the second stage 13. This jacket defines with the valve unit 103 the outlet chamber 118 and defines with the valve unit 13 the outlet chamber 120 for the second stage 13. This jacket 111 carries the openings 105 and 119.

Also note that in this embodiment, a flushing valve 191' has been shown as an alternative to the embodiment of the stage 12. This flushing valve 191' prevents the fluid from accessing the flushing filter 18' during a movement in the direction 4. This valve can be provided on all or only one of the stages 12 or 12' and remains optional.

When the filtering device 10 is moved in the direction 5, the fluid rushes, for at least a portion, into the opening 113' of the ferrule 112' of the stage 12'. The second intake valve 106', that the spring 109' tends to thrust against its seat carried by the valve unit 107', opens under the effect of the pressure of the fluid that penetrates into the portion 115' of the filtering chamber, passes through the wall of the main filter 14' and reaches the portion 116' of the filtering chamber. Preferably, a flushing filter 18' is provided. The fluid then passes through this flushing filter 18' and exerts on the ball 1021' a force that makes it possible to open the second release valve 102'. The fluid is released through the outlet openings 114' and penetrates into the chamber 120 from which it is released via the opening 119 located downstream of the seal 110. The fluid 3 then uses the leakage path 500 to flow along the outer wall of the filtering device 10 and pass downstream of the latter.

The portion of fluid passing through the leakage path 500' from upstream of the ferrule 112' engages into the opening 105 before being trapped in the chamber 118 of which the first release valve 102 remains closed.

As such, when the filtering device 10 is moved in the direction 4, the main filter 14 of the first stage 12 filters the fluid and the fluid does not pass through the main filter 14' of the second stage 13. Inversely, when the filtering device 10 is moved in the direction 5, the main filter 14' of the second stage 13 filters the fluid and the fluid does not pass through the main filter 14 of the first stage 12.

As such, at each direction of progression of the fluid, valves mounted in opposition open only one filtration stage.

In this embodiment shown in FIG. 4, the diversion device which makes it possible to control the routing of the fluid through the filtering device comprises in particular the intake valves 706, 706', 106, 106', the inlet openings 108, 108', the outlet openings 105, 114, 114', 119.

The embodiment of FIG. 4 shows the aforementioned advantages for the embodiment shown in FIGS. 1 to 3. In addition it has for advantage to be bidirectional.

Preferably, in each one of the embodiments of the invention, each valve unit comprises several valves such as shown in the figures.

The embodiment shown in FIGS. 5, 6, 7 and 8 has the advantages of the embodiments shown in FIGS. 1 to 3.

It is also bidirectional. Moreover, it has for advantage to use a single filter for providing the filtering in each one of the movement directions and while preventing the wall of the filter from being passed through in both directions 200, 201.

This filtering device 10 comprises a body 101 which cooperates at each one of its ends with a valve unit 800, 800' in such a way as to form a sealed enclosure except for inlet openings 708, 708' and outlet openings 114, 114' and optional flushing holes 19, 19'.

A main filter 14 is housed inside the enclosure forming the filtering chamber. A diversion device comprising intake valves 706, 706' makes it possible to authorize or prevent the fluid from accessing the filtering chamber. The filtering chamber has an inner portion 115 delimited by the inner wall 15 of the main filter 14 and by the valve units 800, 800' as well as an outer portion 116 delimited by the outer wall 16 of the main filter 14, by an inner wall of the body 101 and by the valve units 800, 800'.

Each one of the intake valves 706, 706' allows the fluid to access the portion 115 of the filtering chamber located inside the main filter 14. These two intake valves 706, 706' are configured to not be opened simultaneously. The portion 115 of the filtering chamber is closed except for the openings 708, 708' controlled by the intake valves 706, 706'. The fluid reaching the portion 115 of the filtering chamber can be released therefrom only by passing through the main filter 14 from its inner wall 15 to its outer wall 16. As such, the fluid passes through the main filter 14 always in the same direction 200. The outlet openings 114, 114' allow the fluid having passed through the fluid to exit the portion 116 of the filtering chamber and to exit the filtering device 10.

Figure 5:
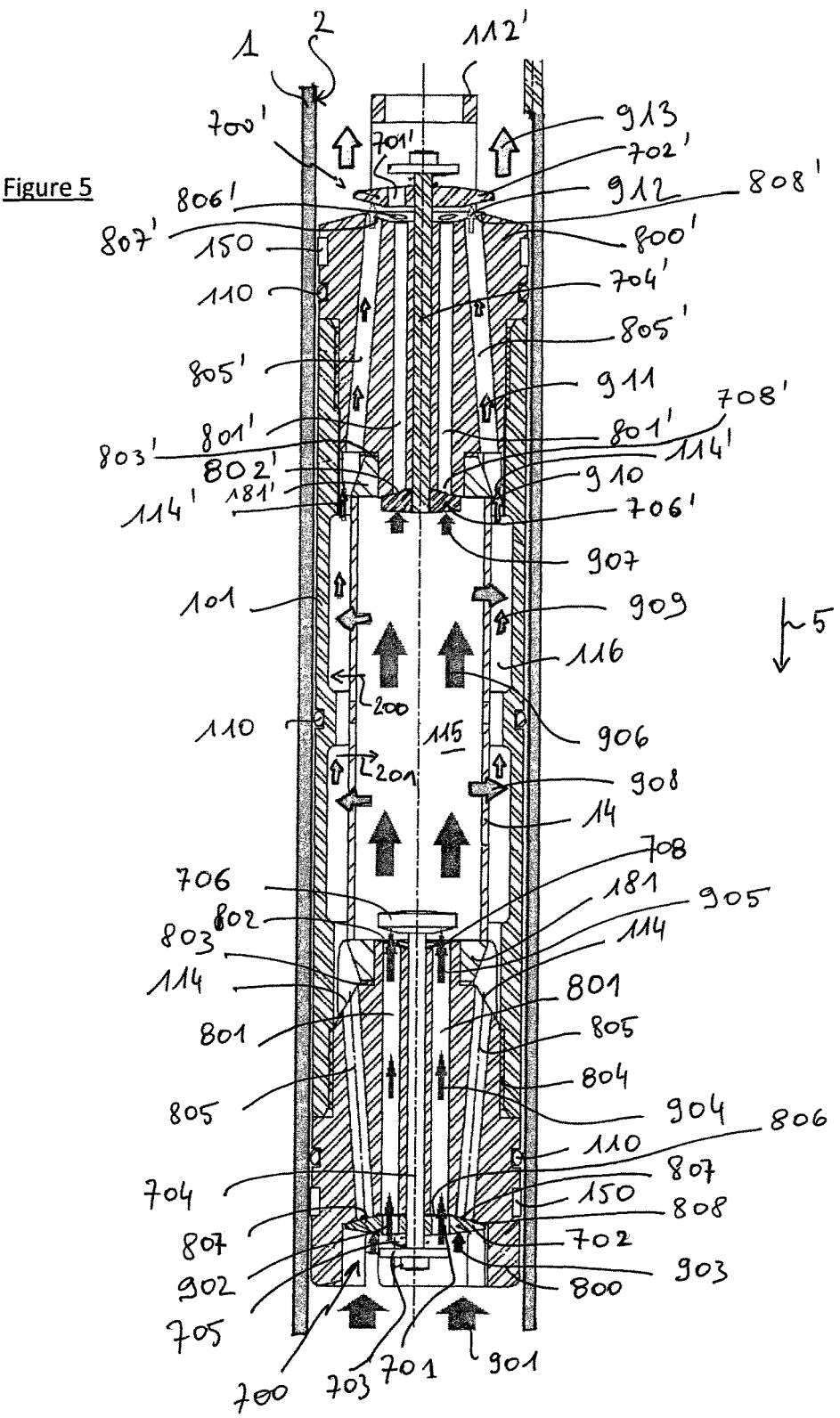
FIG. 5 is a drawing of a longitudinal cross-section view of a third embodiment allowing for a filtration of the fluid by the same filter regardless of the movement direction of the filtering device, this figure shows the flow of the fluid when the filtering device is moved in the second direction.

This filtering device 10 and its diversion device shall be detailed in reference to FIG. 5 which shows an embodiment wherein the filtering device 10 is moved in the direction 5, i.e. downwards. This movement can be generated by a movement applied to a beam fixed to the filtering device 10 by a ferrule 112' and a housing for fixing the beam 122. Preferably, the filtering device 10 is symmetrical with respect to a median plane perpendicular to the direction of the movement of the filter holder 100. In this figure, the filtering device 10 is symmetrical with respect to a vertical plane passing through the middle of the filter holder 100.

As such, in this embodiment also, at each direction of progression of the fluid, the valves mounted in opposition systematically activate the single filtration stage.

The fluid 901 located upstream of the valve unit 800 penetrates 902 into a hole 701 made in the release valve 702 of a shutter 700. This hole 701 is arranged next to an inlet orifice 806 carried by the valve unit 800 and giving access to an inlet duct 801 that forms at its end an inlet opening 708 opening into the portion 115 of the filtering chamber. The end of the inlet duct 801 forms a seat for the intake valve 706 that controls the access of the fluid in the portion 115 of the filtering chamber. The fluid that does not passes 903 through the hole 701 cannot enter into the filtering device.

When fluid comes from 904 the inlet duct 801, it exerts 905 a force that tends to separate the intake valve 706 with respect to the seat 802. The minimum force to separate the valve from its seat is adjusted by a spring 705 described hereinbelow and which exerts on the valve a force opposite to that of the fluid.

The fluid as such penetrates 906 into the portion 115 of the filtering chamber located inside the main filter 14. At the opposite end of this portion 115 of the filtering chamber, the ducts 801' are closed off by the intake valve 706' which remains closed under the effect of the fluid 907.

The intake valve 706 is fixed to a rod 704. Note that outside of any movement of said filtering device 10, the intake valves 706, 706' remain closed because for the intake valve 706 a spring 705 arranged between the release valve 702 and a nut 703 fixed to the other end of the rod 704 exerts a force that tends to thrust the intake valve 706 against its seat 802, and for the intake valve 706', the rod 704', the spring 705' and the nut 703' associated with the valve unit 800'.

The fluid can be released from the portion 115 of the filtering chamber only by passing through 908 the filter in the direction 200. The fluid then reaches 909 the portion 116 of the filtering chamber from which it can be released by penetrating 910, 911 into the outlet duct 805' that can be accessed via the outlet opening 114'. The fluid exerts 912 on the release valve 702' a force that tends to separate the release valve 702' from its seat 808' and from the outlet orifice 807 of the duct 805' as such allowing for a free removal 913. Indeed, the release valve 702' does not have a hole at the level of the outlet orifice 807' of the duct 805'. Note that this separation of the release valve 702' contributes to thrusting the intake valve 706' on its seat 802' (when the fluid does not oppose any force on the valve 706'). As the two valves 706' and 702' are integral or at least linked together, the seal of the valve 706' is reinforced since the fluid exerts both a force on the valve 706' and a force of the valve 702' and these two forces tend to thrust the valve 706' onto its seat 802'.

Preferably, each valve unit 800, 800' comprises several inlet ducts 801, 801' and several outlet ducts 805, 805'.

Figure 6:
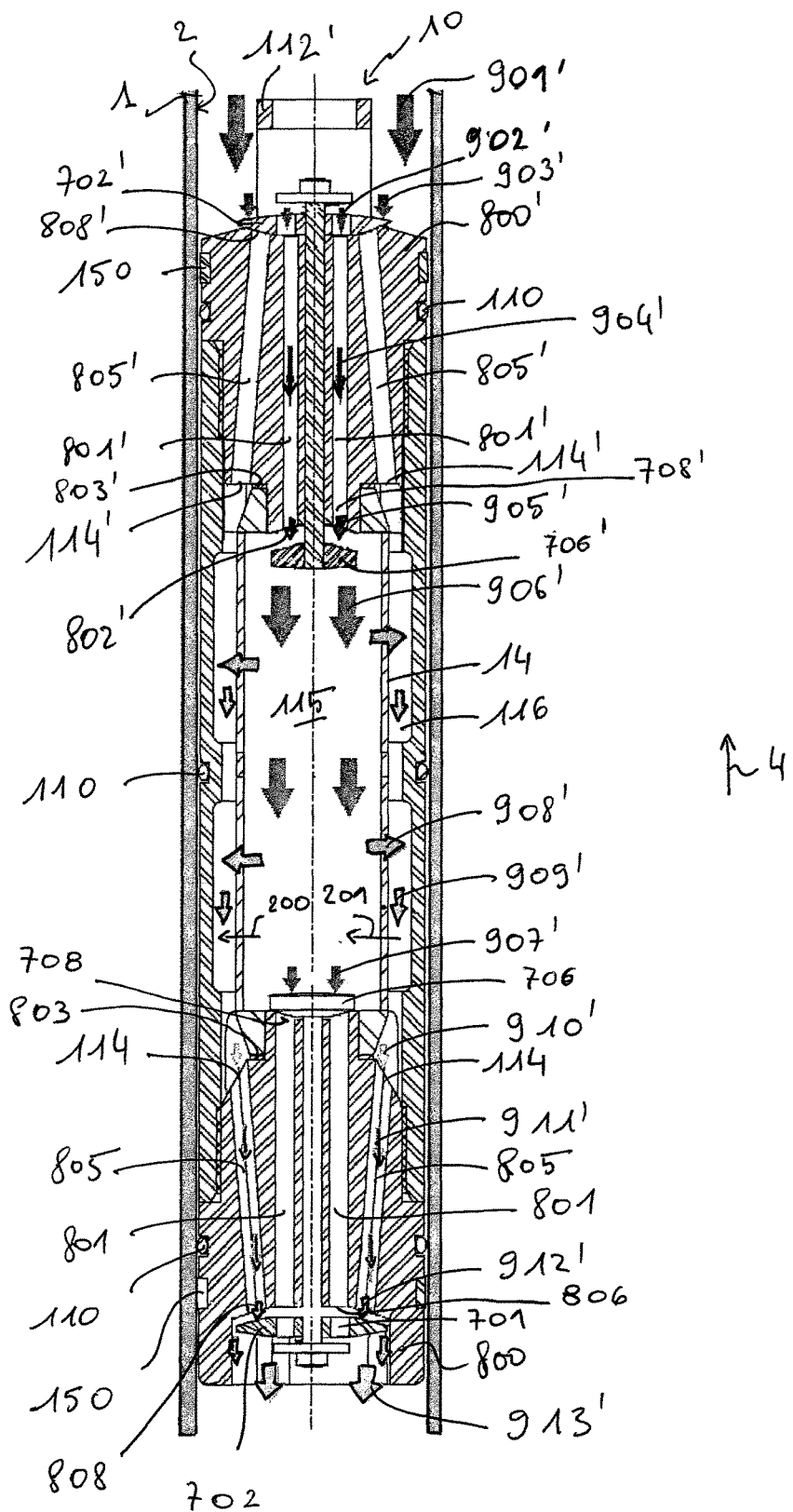
FIG. 6 includes FIG. 5 and shows the flow of the fluid when the filtering device is moved in the first direction.

FIG. 6 shows the filtering device of FIG. 5, when the latter is moved in the opposite direction i.e. in the direction 4 (towards the top in FIGS. 5 and 6), the fluid 901' penetrates 902', 904' into the inlet duct 801' by passing through holes 701' of the release valve 702 of the fourth valve. On the seat 802', the fluid pushes 905' the valve 706' downwards and penetrates 906' into the portion 115 of the filtering chamber. The intake valve 706 remaining closed, the fluid passes through 908' the wall of the main filter 14 and reaches the portion 116 of the filtering chamber.

If fluid rises via the outlet duct 805', it will not be able to be released as the fluid 903' upstream of the release valve 702' maintains the latter in contact with the valve unit 800' and as such closes the ends of the outlet duct 805'.

The fluid can then be released 910', 911' only via the duct 805 and its outlet orifice 807 and as such returns 912', 913' downstream of the filtering device 10. The fluid can also be released through the flushing holes 19, 19', preferably as shown in FIG. 6, of the seals 110 are arranged upstream and downstream of each flushing hole 19, 19'. As such, the fluid passing through the hole 19 or 19' penetrating into the space between the filtering device 10 and the inner wall 2 of the container 1 is confined in this space.

As such, regardless of the direction of movement of the filtering device 10, the fluid is filtered and the main filter 14 is passed through in a single direction 200. The residue is therefore not discharged via an inverse flow. Moreover, a single filter allows for filtering in both directions, which facilitates the assembly of the filtering device 10 as well as the storage and the manipulation of used filters.

Moreover, all of the residue is trapped on the inner face of the filter which reduces the risks of pollution during the handling thereof.

Note that the invention extends however to the case where the filter is passed through in a single direction opposite to direction 200.

In this embodiment shown in FIGS. 5 and 6, the diversion device making it possible to control the routing of the fluid in particular comprises the release valves 702, 702', the intake valves 706, 706', the inlet 801, 801' and outlet 805, 805' ducts, the outlet openings 114, 114'.

Preferably, the filtering device 10 has a simple and robust structure. In the example shown each valve unit 800, 800' is added to the body 101 of a generally cylindrical shape in order to form an enclosure. A fastening via screwing can be provided as shown by the threadings 804, 804' carried by the valve units 800, 800' and the body 101. Prior to this assembly, the main filter 14 can be inserted which then has the form of a filtering cartridge. Just as the filtering devices shown in the preceding figures, the one in FIGS. 5 and 6 can be disassembled entirely which facilitates the maintenance and depollution thereof.

Figure 7:
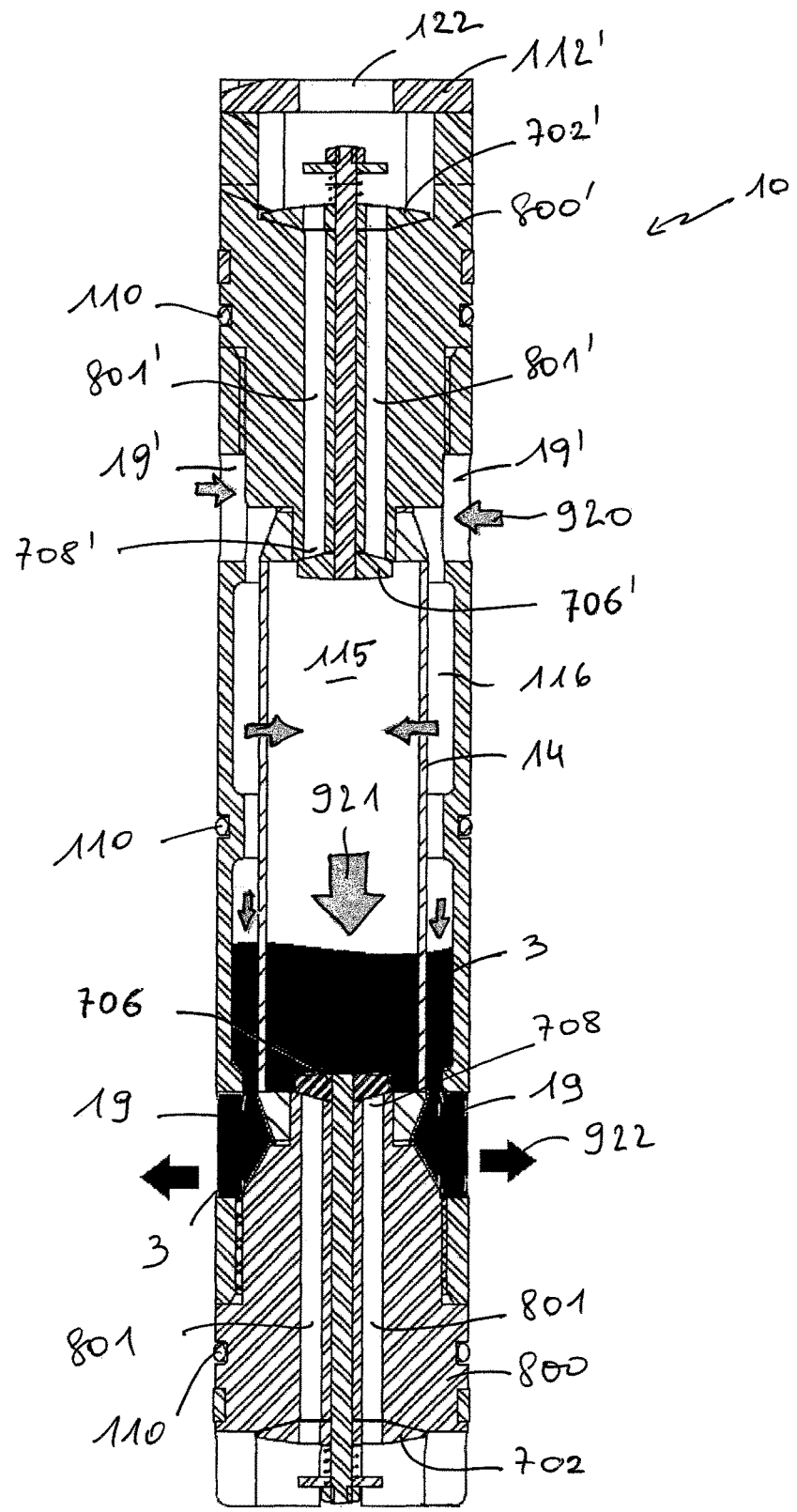
FIG. 7 shows the filtering device of the embodiment of FIG. 5 according to a longitudinal cross-section offset 90° with respect to the cross-section of FIG. 5 and during a flushing.

The cross-section view of FIG. 7 shows the flushing holes 19, 19'. These flushing holes 19, 19' are arranged at each end of the portion 116 of the filtering chamber. When the device is removed from the container or is brought in a larger section of the container allowing for a flow between the seals 110 and the inner wall of the container, the fluid 3 present in the portion 116 is released via gravity from the flushing holes 19, as shown by the arrows 920 to 922. The holes 19' balance the pressure of the chambers 115 and 116 with the outside medium, facilitating the flow by gravity via the holes 19. This flushing is as such automatic.

Preferably, at each end of the main filter 14, a portion of the filter with a higher filtering power is provided in such a way as to be able to form two flushing filters 181, 181' able to ensure a particularly fine filtering of the fluid before it is removed by the flushing holes 19. In an alternative or combined manner, the elements 181' and 181' are end ferrules of the filter 14.

Preferably, scrapers 150 are also provided of which the operation was described hereinabove. Note that the seals 110 preferably do not have a scraping function and will therefore be longitudinally located between the scrapers. The scraping residue is as such filtered. According to another embodiment not shown, the seals 110 also act as scrapers. In this case, the scrapers 150 can be suppressed.

Figure 8:
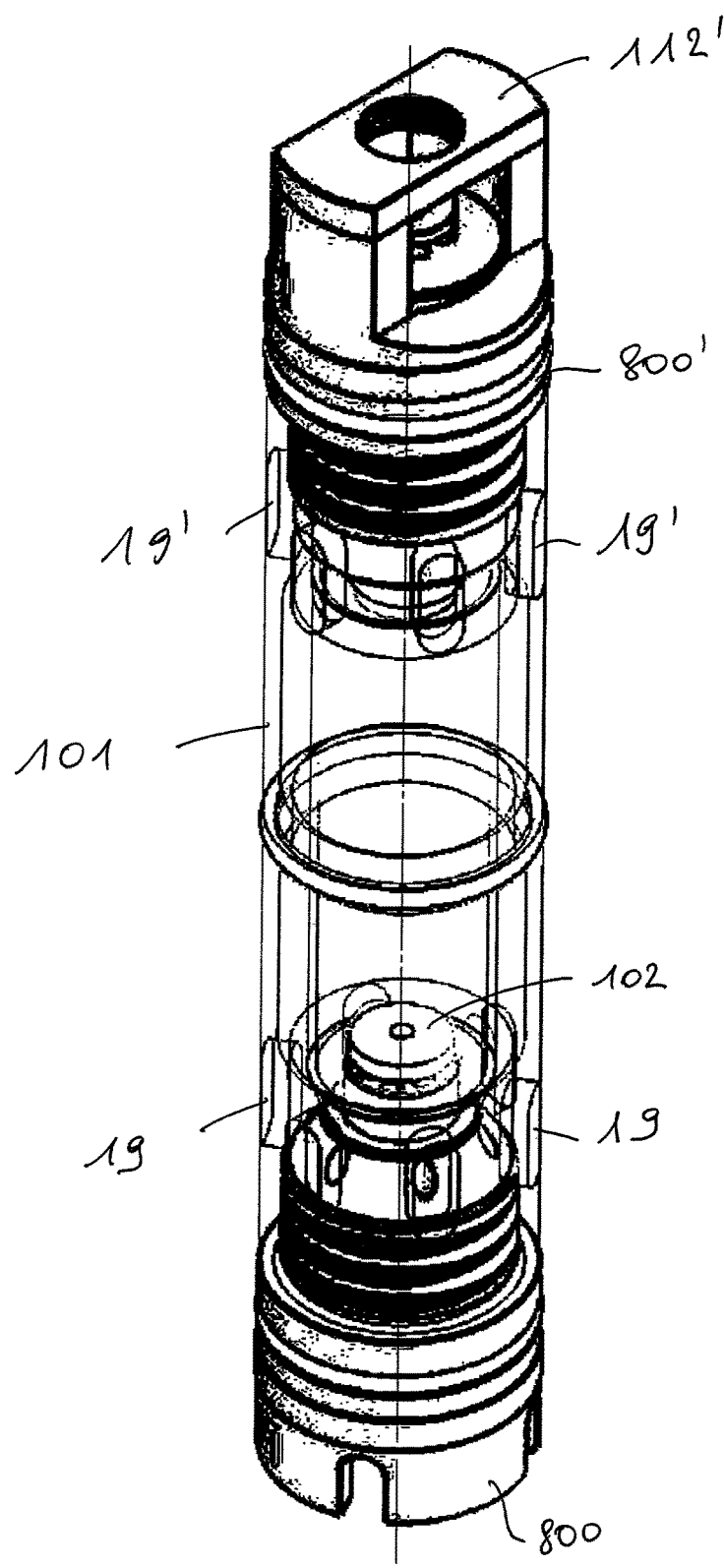
FIG. 8 is a perspective view of the embodiment of FIG. 7.

FIG. 8 shows in perspective the filtering device forming a filtering cartridge. This figure dearly shows the simplicity in the manufacturing and assembling of the filter holder which primarily comprises three parts: the valve units 800, 800' and the body 101.

The following characteristics are common to all of the embodiments described hereinabove. The beam 11 can be activated manually or mechanically and can be rigid or flexible. In this case where it is flexible, it is radially flexible and longitudinally uncompressible. It can be wound around a mandrel and can be driven via motorization of the mandrel. The beam can also be telescopic. The embodiments described hereinabove provide a filtering device configured to be moved in translation in the fluid. The invention also extends to filtering devices that can be moved in rotation.

The outer geometry of the filter holder is entirely modulable: it can be adapted to any duct geometry. The minimum diameter is according to the possibility of miniaturization of the filter holder and of the filter.

Likewise, the length of the filter and of the filter holder can be adapted for each use, in particular by the sole length of the body 101. Advantageously, these adaptations do not require modifying the valve units.

Preferably, the valves internal to the filter holder are of metal/metal contact, of a relative seal, as such better supporting the chemical aggressiveness (corrosion) of the filtered liquids than what polymer seals could do. However, the replacing of the bearing surfaces of the metal seals with polymer seals is possible without changing the principle of the bidirectional valves.

According to an embodiment, the filter holder is entirely made of metal like the filters. In this way, they are fully compatible with a use with liquid metal and in a very irradiant medium.

In the examples shown, a single filter purifies the liquid for each direction of filtration. However, the invention extends to the cases where several filters are arranged in series, in order for example to ensure a progressive filtering of the fluid.

Moreover, the filter is adapted to the granulometry of the residue; it can have several screen thicknesses in order to prevent clogging too quickly the fine porosity with rough residue. It is sufficient for example to arrange the screen thicknesses according to their porosity with increasing fineness, from the inside to the outside of the filtering cartridge.

This filter holder can be adapted to the container of the fluid either by modifying the seals (to a certain extent) or by increasing or decreasing the sections of the components.

The seal towards the inner wall of the container is not a high requirement, a certain leakage rate can be considered in order to favor the ease of manipulating the filter holder for its filtering effectiveness. Indeed, a strong filter holder/container seal would bring into a single passage to be filtered all of the fluid, risking premature clogging, while a slight leakage flow can guarantee the removal of the filter holder, regardless of its rate of closing. It will then be required to proceed with several back-and-forth movements in order to progressively reduce the pollution density of the filtrate.

In light of the above, it appears clearly that a device according to the invention offers many advantages.

In particular, in relation to known filtering solutions, it is distinguished by its great ease in implementation, its compactness, its very low cost of production and operation. It is easy to disassemble, in particular for the replacing of the filtering cartridges. It is furthermore particularly reliable. Its reliability comes in particular from the fact that it makes it possible to avoid any electronic or electric component. Moreover, outside of the valves, no mechanism with articulated parts is required.

Moreover, it makes it possible to avoid any circuit external to the filtered equipment since this filter operates in situ. Indeed, most of means of purification are based on a transfer of the fluid and its forced passage in a filtering medium, via a pump and ad-hoc circuit. On the contrary, this filter holder is brought in the liquid to be filtered which can as such remain static, which, in the case of dangerous fluids, substantially reduces the risk and the costs associated with implementing a loop dedicated to filtration.

Furthermore, it can be adapted to the dimensions of highly variable pipes, in inaccessible places and especially for liquids that cannot easily be taken out of their 3 container. This invasive filter holder is therefore especially suited to fluids that cannot be moved.

The system can be manual, which guarantees both great simplicity for implementation and an indication of the clogging of the filter though excessive loss of load and difficulty in handling (back-and-forth) the filter holder. This increase in the loss of load can also be identified by sensors external to the container and associated with a mechanical actuating of the filter holder.

Its bidirectional effectiveness as well as the retaining inside the filtering cartridge are particularly advantageous for uses in dangerous mediums.

For example, the filtering device according to the invention is particularly advantageous foe a use in a nuclear environment, in particular for the cold extraction of NaK precipitates present in certain types of test devices of irradiation reactors (such as OSIRIS).

However, the filtering device according to the invention can receive many other uses such as for example the removal of solid particles in a contaminated liquid (Na, NaK, Pb—Bi, water . . . ), such as nuclear fuel residue coming from breakage of rod sheaths in its coolant.

These situations van be found in circuits that are difficult to access during dismantling, in the remainder of test devices that have performed tests of sheath breakage or during a post-accident situation requiring a prior decontamination of the most irradiating solid particles before retreatment of the effluents (in sumps for example).

Specially designed for the nuclear environment, this filter holder can be extended for uses in fluids that have other types of dangerousness, bacteriological or chemical in particular.

The purification of a volume of liquid that is excessive for the passage thereof in a dedicated circuit or of a volume that is very difficult to access even by a beam. For this, the seal of the seals can be lowered, even entirely suppressed by suppressing the seals including the scrapers. In this case, the self-flushing function would have to be reconsidered. This use would then rather relate to the introduction of the filter holder into an "open" medium, via a significant number of back-and-forth movements in order to locally extract the pollutants. The homogenization of the pollutants in the medium with a concentration that decreases as the oscillations of the filter occur would then be used.

The extraction of residue in particular floating in the large extents of water. For this, it is suitable to adapt the inlet section of the fluid and of the filter and possibly to shorten the height of the filter. It is also possible to suppress the self-flushing and provide a keel function in order to force the filter holder to retain a vertical position. This type of filter holder, entirely passive, could then be used for example for depolluting seas of their microparticles (of millimetric size) such as the zone of the Pacific Ocean commonly referred to as the "sixth continent". The filter holder device would then be perfectly independent of any container purpose simply immersed in a large volume of liquid. It would be moved by waves and swells and would oscillate passively.

The invention is not limited to only the embodiments and examples described hereinabove, but extends to all of the embodiments falling within the scope of the claims.

REFERENCES

| | | | |
|---|---|---|---|
| 1. | Container | 118. | Outlet chamber |
| 2. | Inner wall of the container | 119. | Leakage opening |
| 3. | Fluid | 120. | Leakage chamber |
| 4. | $1^{st}$ movement direction | 121. | Shoulder |
| 5 | $2^{nd}$ movement direction | 122. | Housing for fixing the beam |
| 10. | Filtering device | 123. | Filter seal |
| 11. | Beam | 150. | Circumferential scraper |
| 12. | Filtration stage | 151. | End scraper |
| 13. | Filtration stage | 181. | Filter end ferrule |
| 14. | Main filter | 14'. | Filter |
| 15. | Inner wall of the filter | 15'. | Inner wall of the filter |
| 16. | Outer wall of the filter | 16'. | Outer wall of the filter |
| 17. | Base of the filter | 17'. | Base of the filter |
| 18. | Flushing filter | 18'. | Flushing filter |
| 19. | Flushing hole | 19'. | Flushing hole |
| 100. | Filter holder | 102'. | Second release valve |
| 101. | Body | 1021'. | Ball |
| 102. | First release valve | 1022'. | Seat |
| 103. | Bloc valve | 103'. | Valve unit |
| 104 | Spring | 104'. | Spring |
| 105. | Outlet opening | 106'. | Second intake valve |
| 106. | First intake valve | 107'. | Valve unit |
| 107. | Valve unit | 108'. | Chamber inlet opening |
| 108. | Chamber inlet opening | 109'. | Spring |
| 109. | Spring | 111'. | Jacket' |
| 110. | Seal | 112'. | Ferrule |
| 111. | Jacket | 113'. | Orifice |
| 112. | Ferrule | 114'. | Outlet opening |
| 113. | Orifice | 115'. | Portion of filtering chamber |
| 114. | Outlet opening | 801. | Inlet duct |
| 115. | Inner filtering chamber portion | 802. | Intake seat |
| 116. | Outer filtering chamber portion | 803. | Filter seal |
| 116'. | Portion of filtering chamber | 804. | Threading |
| 151' | End scraper | 805. | Outlet duct |
| 181. | Filter end ferrule | 806. | Inlet orifice |
| 191'. | Flushing valve | 807. | Outlet orifice |
| 500'. | Leakage path | 808. | Release seat |
| 200. | Filtering direction | 800'. | Valve unit |
| 201. | Direction opposite to the filtering direction | 801'. | Inlet duct |
| | | 802'. | Intake seat |
| 401-406. | Filtering path | 803'. | Filter seal |
| 500-503. | Leakage path | 804'. | Threading |
| 601-603; 605-606: | Leakage path | 805'. | Outlet duct |
| 700, 700' | Shutter | 806'. | Inlet orifice |
| 701, 701' | Hole | 807'. | Outlet orifice |
| 702, 702' | Release valve | 901-913 | Filtering path |
| 703, 703' | Nut | 901'-913' | Filtering path |
| 704, 704' | Rod | 920-922 | Flushing path |
| 705, 705' | Spring | 1002 | Valve |
| 706, 706' | Intake valve | 1003 | Spring |
| 708, 708'. | Inlet openings | | |
| 800. | Valve unit | | |

The invention claimed is:

1. A filtering device configured to be immersed at least partially in a fluid to be filtered and comprising at least one main filter and a filter holder supporting the main filter, wherein the filtering device is configured to be moved inside the fluid and wherein;

the filter holder comprises a body and at least one first and a second valve units, the body and the at least one first and second valve units defining a filtering chamber inside of which the main filter is arranged;

the main filter has an outer wall facing the body and an inner wall opposite to the outer wall; the main filter delimiting in the filtering chamber an inner portion and an outer portion of the filtering chamber, the inner portion facing the inner wall of the main filter and the outer portion facing the outer wall of the main filter the filter holder comprises at least one inlet opening defined by the at least one first valve unit and at least one first intake valve cooperating with the at least one inlet opening and configured to allow the fluid to pass through the at least one inlet opening only when the filtering device is moved in a first movement direction;

the filter holder comprises at least one outlet opening defined by the at least one second valve unit and at least one first release valve cooperating with the at least one outlet opening and configured to allow the fluid to pass through the at least one outlet opening only when the filtering device is moved in said first movement direction;

the at least one first intake valve being arranged upstream of the at least one first release valve with respect to the direction of flow of the fluid in the filtering device when the filtering device is moved in the first movement direction;

the passage of the fluid through the at least one inlet opening allowing the fluid located upstream from the filtering device when the filtering device is moved in the first movement direction to penetrate into the filtering chamber;

the passage of the fluid through the at least one outlet opening allowing the fluid located in the filtering chamber to flow outside of the filtering chamber when the filtering device is moved in the first movement direction;

the at least one inlet opening and the at least one outlet opening being arranged in such a way that when the filtering device is moved in said first movement direction, the fluid passes through the main filter in a first filtering direction to pass from the at least one inlet opening to the at least one outlet opening;

the filtering device being configured to prevent the fluid from passing through the main filter in a second filtering direction opposite to the first filtering direction when the filtering device is moved in a second movement direction opposite to the first movement direction.

2. The filtering device according to claim 1, wherein the at least one inlet opening opens into the inner portion of the filtering chamber and the at least one outlet opening opens into the outer portion of the filtering chamber, such that the fluid must pass through the main filter from the inner wall of the main filter to the outer wall of the main filter.

3. The filtering device according to claim 1 wherein the filtering device is configured to be moved in translation inside a container in which the fluid is contained.

4. The filtering device according to claim 1, wherein the at least one first intake valve is configured to prevent the entering and the exiting of the fluid respectively in and out of the inner portion of the filtering chamber and through the at least one inlet opening when the filtering device is moved in the second movement direction.

5. The filtering device according to claim 1, comprising at least one second intake valve associated with at least one second opening and configured to allow the fluid to pass from the outside of the filtering chamber to the inner portion of the filtering chamber via said at least one second inlet opening when the filtering device is moved in the second movement direction and configured to prevent the entering and the exiting of the fluid respectively in and out of said first portion via said at least one second inlet opening when the filtering device is moved in the first movement direction;

the at least one first intake valve being arranged upstream of the at least one second intake valve with respect to the direction of flow of the fluid in the filtering device when the filtering device is moved in the first movement direction.

6. The filtering device according to claim 4, comprising the at least one outlet opening which comprises two outlet openings configured to allow the fluid to pass from the outer portion of the filtering chamber to the outside of the filtering chamber downstream of the filtering device, with one of the two outlet openings allowing for the exiting of the fluid downstream of the filtering device when the filtering device is moved in the first direction and the other of the two outlet openings allowing for the exiting of the fluid downstream of the filtering device when the filtering device is displaced in the second direction.

7. The filtering device according to claim 6, comprising at least one second release valve associated with one of the two outlet openings, with the at least one second release valve being configured to allow the passing of the fluid from the outer portion downstream of the filtering device when the device is moved in the second direction and to prevent the passing of the fluid from the upstream of the filtering device to the outer portion of the filtering chamber when the device is moved in the first direction.

8. The filtering device according to claim 7, wherein each release valve prevents the passage of the fluid to the at least one outlet opening that is associated with said each release valve when said each release valve is thrust on a seat carried by one of the valve units and comprises a hole arranged at the level of an inlet orifice allowing the fluid located upstream from the filtering device to access the first and second intake valves.

9. The filtering device according to claim 1, wherein the filtering device is configured to prevent the fluid from passing through the main filter when the filtering device is moved in the second movement direction.

10. The filtering device according to claim 1, wherein the at least one first release valve is arranged downstream of the main filter, relative to the movement direction of the fluid with respect to the filtering device when the filtering device is moved in the first movement direction and arranged upstream of the main filter, relative to the movement direction of the fluid with respect to the filtering device when the filtering device is moved in the second movement direction, with said first release valve being configured:

to open under the pressure of the fluid that has passed through the main filter when the filtering device is moved in the first movement direction in such a way as to allow the fluid having passed through the main filter to exit the filtering device;

to maintain said at least one first release valve closed otherwise.

11. The filtering device according to claim 9 wherein the at least one first intake valve is arranged upstream of the main filter, relative to the movement direction of the fluid with respect to the filtering device when the filtering device is moved in the first movement direction and arranged downstream of the main filter, relative to the movement direction of the fluid with respect to the filtering device when the filtering device is moved in the second movement direction, said at least one first intake valve being configured:

to open under the pressure of the fluid when the filtering device is moved in the first movement direction in such a way as to allow the fluid to arrive in the main filter;

to maintain said first intake valve closed otherwise.

12. The filtering device according to claim 9, wherein the filtering device is configured to form, when the filtering device is moved in the first movement direction, at least one filtering path passing through the main filter and configured in such a way as to form, when the filtering device is moved in the second movement direction, at least one leakage path through which the fluid bypasses the main filter.

13. The filtering device according to claim 12, wherein the filtering device is configured to be placed next to an inner wall of a container in which the fluid is contained and wherein the leakage path is formed, partially at least, by a portion of space located between said inner wall of the container and an outer wall of the filtering device.

14. The filtering device according to claim 12, wherein the filtering device is configured that, when the filtering device is moved in the first movement direction, all the fluid passed through by the filtering device passes through the filtering path.

15. The filtering device according to claim 12, wherein the filtering device is configured that, when the filtering device is moved in the first movement direction, a part of the fluid passed through by the filtering device passes through the filtering path and another part of the fluid passed through by the filtering device passes through the leakage path.

16. The filtering device according to claim 10, comprising two main filters and comprising a first and a second filtration stages, with each stage comprising one of the main filters, the filtering device being configured such that:

when the filtering device is moved in the first movement direction, at least one part of the fluid passes through the main filter of the first stage and does not pass through the main filter of the second stage, when the filtering device is moved in the second movement direction, at least one part of the fluid passes through the main filter of the second stage and does not pass through the main filter of the first stage.

17. The filtering device according to claim 10, wherein the shape of the at least one main filter defines a cavity that has at least one opening and at least one filtering wall, the inner wall of the filter being turned towards the inside of the cavity and the outer wall of the filter being turned towards the outside of the cavity, the filtering device being configured such that the fluid penetrates into the cavity through the at least one opening of the cavity and is released therefrom by passing through the filtering wall from the inner wall to the outer wall when the filtering device is moved in the first direction.

18. The filtering device according to claim 17, wherein the filtering device is configured to be moved in translation inside a container, wherein the cavity extends along the direction of translation of the filtering.

19. The filtering device according to claim 1, comprising a flushing device configured to allow a flow of the fluid under the effect of gravity when the filtering device is sufficiently separated from an inner wall of a container inside of which the fluid is contained in order to be able to flow freely at the periphery of the filtering device.

20. The filtering device according to claim 19, wherein the flushing device comprises at least one flushing hole allowing the fluid that the flushing device contains to flow to the outside by bypassing the at least one first release valve configured to control the exiting of the fluid out of a filtering chamber containing the at least one main filter.

21. The filtering device according to claim 20, comprising a flushing filter, arranged such that the fluid passing through the flushing hole must pass through the flushing filter.

22. The filtering device according to claim 1, wherein the at least one main filter is fixed in a removable manner to the filter holder.

23. The filtering device according to claim 1, wherein the filter holder is made of metal.

24. A system comprising a container able to contain a fluid to be filtered and a filtering device according to claim 1, the filtering device being arranged inside the container and being configured to be moved manually or mechanically inside the container in such a way as to filter the fluid at least when it is moved in a first direction.

25. The system according to claim 24, wherein the container is a duct or a tank.

26. The system according to according to claim 24, wherein the container has an inner wall and the filtering device comprises at least one longitudinal scraper configured to scrape the inner wall of the container.

27. The system according to claim 1, wherein the filtering device comprises, at least one of the ends of the filtering device, at least one end scraper protruding beyond an outer casing of the filtering device.

28. A method for depolluting a fluid, the method comprising moving a filtering device according to claim 1 inside a fluid wherein the filtering device is immersed at least partially and wherein the fluid passes through the at least one inlet opening only when the filtering device is moved in a first movement direction;

the fluid passes through the at least one outlet opening only when the filtering device is moved in said first movement direction; and wherein the passage of the fluid through the at least one inlet opening allows the fluid located upstream from the filtering device when the filtering device is moved in the first movement direction to penetrate into the filtering chamber, wherein the passage of the fluid through the at least one outlet opening allows the fluid located in the filtering chamber to flow outside of the filtering chamber when the filtering device is moved in the first movement direction, wherein when the filtering device is moved in said first movement direction, the fluid passes through the main filter in a first filtering direction to pass from the at least one inlet opening to the at least one outlet opening, and wherein the filtering device prevents the fluid from passing through the main filter in a second filtering direction opposite to the first filtering direction when the filtering device is moved in a second movement direction opposite to the first movement direction.

29. The method for depolluting according to claim 28, the method further comprising providing a duct or a tank in a nuclear reactor or factory, wherein the duct or the tank contains the fluid, and moving the filtering device, wherein the said moving is carried out manually or mechanically.

30. The method for depolluting according to claim 28, wherein the fluid is a water contained in a sea or in a lake and wherein the moving of the filtering device is provoked by swells.

* * * * *